United States Patent [19]

Kei et al.

[11] Patent Number: 4,889,578
[45] Date of Patent: Dec. 26, 1989

[54] METHOD FOR MANUFACTURING RUBBER VIBRATION INSULATOR USING A HALOGEN COMPOUND SOLUTION

[75] Inventors: Mori Kei; Kikyo Mitsuyuki; Yabuki Kouiti, all of Okayama, Japan

[73] Assignee: Kurashiki Kako Co., Ltd., Okayama, Japan

[21] Appl. No.: 150,055

[22] Filed: Jan. 29, 1988

[51] Int. Cl.$^4$ .............................. C09J 5/02; F16F 9/02
[52] U.S. Cl. .................................... 156/294; 156/316; 267/141.2; 403/228
[58] Field of Search ............... 156/293, 294, 333, 316, 156/319; 428/465, 466; 425/501, 517; 403/225, 228; 267/279, 280, 281, 282, 140.1, 140.1, 141.2

[56] References Cited

U.S. PATENT DOCUMENTS

| | | | |
|---|---|---|---|
| 2,468,311 | 4/1949 | Grotenhuis | 403/228 |
| 2,572,215 | 10/1951 | Swart . | |
| 3,387,839 | 6/1968 | Miller | 403/228 |
| 3,642,268 | 2/1972 | Hipsher | 267/281 |
| 4,605,207 | 8/1986 | Konishi | 403/225 |

FOREIGN PATENT DOCUMENTS 0790840 2/1958 United Kingdom ............ 152/209 R
1352645 5/1974 United Kingdom .

*Primary Examiner*—Michael W. Ball
*Assistant Examiner*—Steven D. Maki

[57] ABSTRACT

A method for manufacturing vibration proof rubber by compounding rubber elastic bodies between an inner metal fitting and outer shell metal fitting including the steps of forming a rubber layer by curing adhesion of the rubber elastic bodies to the respective metal fittings, applying a halogen compound solution to the bonding surfaces of the respective rubber layers and then press-fitting the inner metal fitting to the outer shell metal fitting using a lubricant or a lubricating adhesive. The above manufacturing method prevents the defects found in conventional types of vibration proof rubber, particularly disadvantages such as poor durability in a corrosive environment and further the severe requirements which have recently been imposed on vibration proof rubber can sufficiently satisfied.

2 Claims, 1 Drawing Sheet

METHOD FOR MANUFACTURING RUBBER VIBRATION INSULATOR USING A HALOGEN COMPOUND SOLUTION

BACKGROUND OF THE INVENTION

1. Field of the Invention

The present invention relates to a new manufacturing method for vibration proof rubber that is formed by compounding rubber elastic bodies between inner metal fittings and outer shell metal fittings.

2. Prior Art

Conventionally, when vibration proof rubber (a rubber vibration insulator) obtained by compounding rubber elastic bodies between an inner metal fitting and an outer shell metal fitting, such as cylindrical vibration proof rubber, is manufactured, curing adhesion of the rubber elastic body between the inner metal fittings and auxiliary outer cylinder metal fittings is performed first and then, the outer shell metal fitting part is fitted thereto by further performing drawing. This is the method generally utilized. In other types of methods, curing adhesion of the rubber elastic body to the inner cylinder (tubal) metal fitting is first performed and then, after press fitting it to the outer shell fitting, adhering is performed by heating. In yet another method, adhesives are applied to the inner surface of the outer cylinder metal fitting and by cure bonding the rubber elastic body is adhered to the outer cylinder metal fitting. Then after press fitting the inner cylinder metal fitting, with adhesives on the outer surface, into a hole in the rubber elastic body, adhesion using heat is performed (as in U.S. Pat. No. 2,572,215).

However, because the compressibility of the rubber is low in the former method, it is difficult to sufficiently remove the contractive distortion of the rubber, and the durability is poor. In addition, an auxiliary outer cylinder metal fitting is required.

In the latter method, although sufficient preliminary compression can be given to the elastic body, there is a defect in that adhesion between the rubber and the metal is not strong enough.

Recently, for the purpose of alleviating such defect, it has been the practice to treat the bonding area of the rubber elastic body with halogenation. However, due to the halogen component used for the pre-bonding treatment, the bonded base surface of the outer shell metal fitting becomes corroded. Accordingly, this method also cause a bonding defect over a long period of use.

SUMMARY OF THE INVENTION

The object of the present invention are, therefore, to eliminate all of the above-described defects and to provide a new method for manufacturing vibration proof rubber that is capable of meeting the severe requirements relating to vibration proof characteristics which have recently been imposed on vibration proof rubber.

In other words, the new manufacturing method of the present invention provides the following characteristic features to achieve the foregoing objects.

The first characteristic feature of the present invention is that in order to prevent the halogen component used for adhesion of the rubber layer from acting directly on the bonded surface of the metal fitting, the method includes:

adhering, by vulcanization, a rubber layer to the outer surface of the inner metal fitting;

adhering, by vulcanization, at least the rubber layer that is fitted on the outer surface of the foregoing inner metal fitting to the inner surface of the outer shell metal fitting;

applying the halogen compound solution to the bonding surfaces of both of the rubber layers;

press-fitting the inner metal fitting having the rubber layer to the outer shell metal fitting having the rubber layer, using a lubricant or lubricating adhesive; and effecting adhesion between both rubbers layer through heating the above described mutually fitted bodies.

The second characteristic feature of the present invention is that, in order to moderate the stress concentration to the bonding interface between the rubber layers, either one of the mutually fitted rubber layers is made thin in thickness.

The third characteristic feature of the present invention is that, because the rubber layer of the inner metal fitting and the rubber layer of the outer shell metal fitting are separately treated with curing adhesion and molding, it is easy to make the rubber compositions of both layer different from each, thus making it possible to meet the recent severe requirements as to vibration insulating characteristics, through, for example, compounding the rubber elastic bodies with mutually different rubber hardness and damping characteristics.

DETAILED DESCRIPTION OF THE INVENTION

As the material for inner metal fitting and the outer shell metal fitting used in the manufacturing method for the vibration proof rubber of this invention, that has the characteristics feature described above, non-ferrous metals as well as ferrous metals, such as iron, copper, aluminum and tin, and their alloys, are suitable. As to the shape, a cylindrical form, plate form or those with various types of processing added may be used.

The types of rubber to be used include natural rubber, IR, BR, CR, SBR, NBR, EPDN and IIR and it is natural that curing agents, filler materials and other ordinarily used compounding agents are contained in the foregoing types of rubber which are used as the primary component of a single substance or a mixed material.

The halogen compound solutions to be used for the adhesion between the vulcanized rubber layers include chlorinated or brominated polymer compound solution, etc. used as the bonding agent, and sodium hypochlorite, chlorinated cyanuric acid solution, etc. used as the pretreatment agent. Also, as the lubricant process oil, etc., and as the lubricating adhesive urethane system adhesives, epoxy system adhesives, etc. can be used in the present invention.

When pretreatment agents such as sodium hypochlorite and chlorinated cyanuric acid are used in the halogen compound, urethane system or epoxy system adhesives, which are lubricating adhesives, are used. When chlorinated or brominated polymer compounds which have a bonding effect, are used as the halogen compound they are used in combination with a lubricant such as process oil.

The manufacturing method of the present invention as described above exhibits the following effects as described below.

Curing adhesion can be employed for the rubber elastic bodies and metal fittings since the halogen compound does not directly come into contact with metal fittings. Therefore, corrosion-resistance is improved.

A halogen component and a lubricant or lubricating adhesive are used for press-fitting and adhesion between the rubber elastic bodies. Consequently, strong adhesion of the rubbers can be achieved and also, the press-fitting margin can be secured sufficiently resulting in an improvement in the durability of the rubber elastic bodies themselves.

Furthermore, if the rubber layer on either the inner metal fitting side or on the outer shell metal fitting side is made thin, stress concentration to the rubber adhesion interface can be moderated. Also, when the material quality and the form of the rubber layers are made different from each other, the variation range of the vibration proofing characteristics can be expanded.

Hereunder, a description in a concrete and detailed manner will be given with reference to the embodiments of the present invention.

Figure 1:
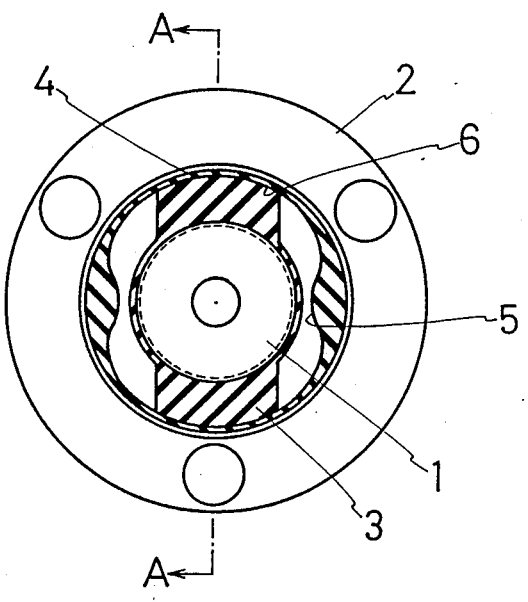
FIG. 1 is a plan view of a product as an embodiment according to the present invention.
Figure 2:
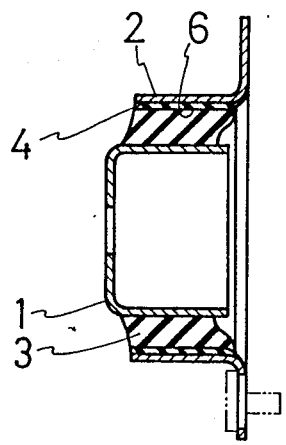
FIG. 2 is a sectional view taken along the line A—A in FIG. 1.

As shown in FIGS. 1 and 2, in a cylindrical vibration proof rubber having an inner metal fitting 1 and an outer shell metal fitting 2 connected to each other by an inside rubber layer 3 and an outside rubber layer 4 interposed between the metal fittings 1 and 2, the inside rubber layer 3 made of sulfur vulcanization system natural rubber, that is 50 (JIS-A unit) in hardness), was adhered by curing to the inner metal fitting 1 made of carbon steel having an outer diameter of 60 mm, 30 mm in height and 3.2 mm in plate thickness, using the ordinary method. The outside diameter of the rubber on the adhesion surface was $\phi 97$ mm, and the adhesion surface before the press-fitting was 40 mm × 25 mm. This adhesion surface was treated with chlorination by using a 2% solution of chlorinated cyanuric acid.

Using the ordinary method, the outside rubber member 4 made of sulfur vulcanization system natural rubber 70 (JIS-A unit) in hardness having stopper portions 5 and thin wall bonding portions of 1 mm thick was bonded by vulcanization to the outer shell metal fitting 2 made of carbon steel, having an inner diameter of $\phi 90$ mm, 30 mm in height and 3.2 mm in plate thickness. The surfaces of the thin wall portions 6 treated with the 2% solution of chlorinated cyanuric acid.

A polyurethane adhesive with a two-part solution of polyether and diisocyanate mixed in to function as a lubrication was applied to the bonding surfaces of both rubber members which were treated chlorinated as described above. After press-fitting a phenol-alkyd system resin coating material was applied and heat applied at 100° C. for 30 minutes. As a result of this procedure the following embodiment samples were obtained.

The comparison sample test products were prepared using the same manufacturing method as that for the embodiments of the present invention, except that the outer shell metal fitting side had the thin wall bonding portions 6 removed. In such Comparison Samples the outer shell fitting did not undergo the chlorination treatment and the bonding metal surface of that outer shell fitting was instead sanded and treated with a degreasing solvent.

The following test was conducted on the embodiments of the present invention and Comparison Samples.

A state wherein 6 mm of distortion was given in the axial direction, the neutral salt spray test according to JIS Z 2371 was carried out for 24 hours. Then, the distortion was removed. Following the above, by setting 70,000 times of repeated durability tests, conducted under the conditions of ±6 mm in vibration amplitude in axial direction and 1.5 Hz in velocity, as one cycle, the test was performed.

In this test, the samples for comparison were broken at the adhesion surface on the outer shell metal fitting side, after the 55,000'th durability test in the second cycle. However, in the embodiments of the present invention, after completion of the third cycle, only peelings of 3 mm to 5 mm in depth were observed on the bonding surfaces between the rubber layers on the flange sides of the outer shell metal fittings.

Following the above mentioned durability test, when the load in the axial direction was applied to them, they were broken at 680 kgf in load. The breaking load in the axial direction before the test was 909 kgf for the Comparison Samples, and 1069 kgf for the embodiment samples of the present invention.

Also, the breaking load in the axial direction after the neutral spray test according to JIS Z 2371, that was conducted separately from the durability test, continuously for 72 hours, in the state with distortion of 6 mm in the axial direction given, was 621 kgf for the Comparison Samples, and 1106 kgf for the Embodiment Samples. In the above, the area of 60% of the broken surface in the Comparison Samples was that of the outer shell metal fitting bare surfaces.

The Embodment Samples and the Comparison Samples are a little different in compressibility by the press-fitting of the rubber portions. However, even the Comparison Samples have enough compressibility to remove distortion. Also, as is apparent from the difference in the breaking load, between the Embodiment Samples and the Comparison Samples, before and after the neutral salt spray test, it was proved that the method of the present invention also provides a bonding surface on the outer shell metal fitting with the rubber layer which is also superior to that of the Comparison Samples.

As should be evident from the results described in detail above, the manufacturing method for vibration proof rubber of the present invention is effective in enabling the manufacture of a product, a rubber vibration insulation, which is remarkably improves the durability of vibration proof rubber without being effected by corrosive conditions, such as salt water, because of the functions as mentioned above. Also, the product produced with the method of the present invention is readily capable of meeting the severe requirements imposed thereon.

We claim:

1. A method for manufacturing rubber vibration insulator formed by compounding rubber elastic bodies between an inner metal fitting and an outer shell metal fitting consisting the ordered steps of:
   forming a thin rubber layer sufficient to cover the metal surface of an inner surface of said outer metal shell;
   forming a thick rubber layer on the metal surface of the inner metal fitting of sufficient thickness to maintain the distance between the inner metal fitting and the outer shell metal fitting;
   adhering by vulcanization said thin rubber and said thick rubber layer to said metal surfaces respectively;

applying a halogen compound solution to adhesion surfaces of both said thin and thick rubber layers;

press-fitting said inner metal fitting having said thick rubber layer to said shell metal fitting having said thin rubber layer using a lubricant or an adhesive having lubricating properties; and adhering both said thin and thick rubber layers together by heating said fitted inner metal fitting and outer shell metal fitting.

2. The method according to claim 1, wherein the halogen compound solution is selected from the group consisting of sodium hypochlorite and chlorinated cyanuric acid.

* * * * *